United States Patent [19]

Schnittker

[11] 3,943,975
[45] Mar. 16, 1976

[54] SOLENOID OPERATED PILOT CONTROLLED VALVE

[75] Inventor: William E. Schnittker, St. Louis, Mo.

[73] Assignee: Emerson Electric Co., St. Louis, Mo.

[22] Filed: Nov. 6, 1974

[21] Appl. No.: 521,246

[52] U.S. Cl. ................ 137/630.14; 251/30; 251/45
[51] Int. Cl.² .......................................... F16K 31/40
[58] Field of Search.......... 137/630.14, 630.13, 630; 251/45, 30

[56] References Cited
UNITED STATES PATENTS 2,392,741   1/1946   Hurlburt .................... 137/630.14 X
3,079,952   3/1963   Miller ............................ 251/30 X

*Primary Examiner*—Arnold Rosenthal

[57] ABSTRACT

A pilot controlled, diaphragm actuated valve having simplified construction is provided with means for fully opening the diaphragm even during low pressure differential conditions. In the preferred embodiment, at least two springs are aligned axially with a pilot valve passageway formed in a pilot valve member. One spring positively seats the diaphragm against a main flow port while the second spring insures diaphragm actuation under all pressure conditions. A third spring may be utilized in certain applications to insure pilot valve closure.

8 Claims, 4 Drawing Figures

SOLENOID OPERATED PILOT CONTROLLED VALVE

BACKGROUND OF THE INVENTION

This invention relates to diaphragm actuated valves and in particular to solenoid operated diaphragm valves incorporating pilot valve actuation.

Diaphragm valves incorporating pilot valve actuation are well known in the art. In general, these valves include a flexible diaphragm interposed between the valve input and the valve output sides. The diaphragm generally includes an opening and higher pressure fluid from the valve input side is allowed to equalize the force acting on each side of the diaphragm. When the main valve is to be activated, a pilot valve is opened which quickly relieves pressure on a first side of the diaphragm, permitting the high pressure fluid on the second side of the diaphragm to lift the diaphragm, thereby opening the main fluid passageway through the valve.

It also is common to employ a solenoid to activate the pilot portion of the valve. The solenoid generally is operatively connected to the pilot valve so that energization of the solenoid opens the pilot valve while de-energization of the solenoid permits closure of the pilot valve. The pressure differential on opposite sides of the diaphragm caused by pressure relief through the pilot valve is used to lift the diaphragm.

In applications where the main inlet fluid pressure fluctuates over relatively wide ranges, solenoid operated diaphragm valves have been known to operate unsatisfactorily. Thus, at high input pressures, the rating of the solenoid may be insufficient to permit the solenoid to operate directly on the diaphragm to open the valve and failure of the solenoid results. While pilot operation of the diaphragm valve is intended to avoid solenoid burn out, at low input pressures, the differential on each side of the diaphragm may be insufficient to open the diaphragm, and flow through the valve becomes unpredictable.

One solution to these general prior art deficiencies is given in the U.S. Pat. No. to Rolfe, 3,208,716, issued Sept. 28, 1965. While the prior art in general, and Rolfe in particular, work well for their intended purposes, some applications require that a relatively high pressure be applied to the pilot valve in order to reduce pilot valve leakage. The application of the higher force to insure pilot valve closure often affects valve operation adversely. The valve disclosed hereinafter is an improvement over the prior art in that it provides positive diaphragm actuation, even at low pressure differentials, while it insures that the pilot valve positively seats.

One of the objects of this invention is to provide a low cost pilot actuated diaphragm valve.

Another object of this invention is to provide a pilot controlled diaphragm actuated valve in which the pilot valve has a positive force acting to close it.

Another object of this invention is to provide a valve construction wherein the force acting to close the pilot valve may be varied according to application use.

Other objects of this invention will be apparent to those skilled in the art in light of the following description and accompanying drawings.

SUMMARY OF THE INVENTION

In accordance with this invention, generally stated, a pilot control diaphragm actuated valve includes means for positively opening the diaphragm even at relatively low inlet pressures. The valve construction permits a solenoid actuated pilot valve to operate against relatively low spring pressure in opening the pilot while it simultaneously provides spring action in seating the main diaphragm valve. Various spring arrangements are disclosed for providing positive closure of the pilot valve in conjunction with positive opening of the main diaphragm valve under a variety of inlet pressure ranges.

DESCRIPTION OF THE PREFERRED EMBODIMENT

Figure 1:
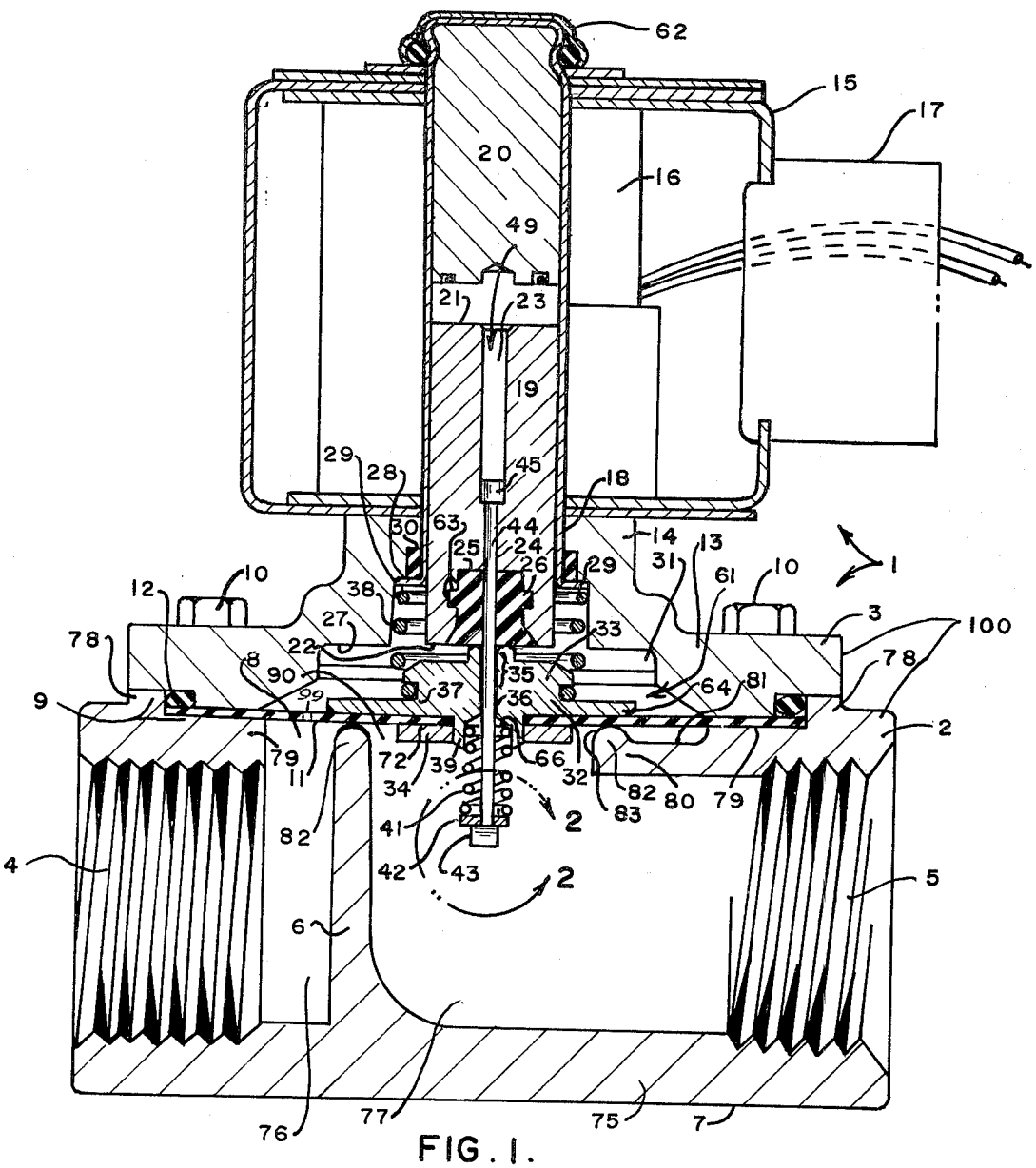
FIG. 1 is a cross-sectional view of one illustrative embodiment of solenoid operated diaphragm valve employing the features of this invention, the valve being shown in its closed position.

Referring now to FIG. 1, reference numeral 1 indicates the valve of this invention. The valve 1 includes a valve casing 100 having a lower portion 2 and an upper portion 3.

Lower portion 2 generally is defined by a tubular section 75 having a threaded inlet 4 and a threaded outlet 5 separated by a partition 6. The partition 6 preferably is integrally constructed with the tubular section 75. However, the partition 6 may be manufactured separately and inserted within the section 75, if desired. Partition 6, in the embodiment illustrated, is annular in plan, having an upper end 82 and a central opening 90 in it. The threaded inlet and outlet 4 and 5, respectively, are utilized to intermount the valve 1 in a particular application. Those skilled in the art will recognize that other forms of interconnecting the valve 1 with another structural component are acceptable. Section 75 has a side wall 7 with an opening 8 through it. Opening 8 communicates with the opening 90 along the upper end 82 of the partition 6. The side wall 7 defines an annular flange 9 about the opening 8. The partition 6 is positioned with respect to the opening 8 in the section 75 so that it delimits an inlet chamber 76, while the opening 90 in the partition 6 communicates with the outlet 5 and with it defines an outlet chamber 77. The flange 9 includes an upwardly projecting lip 78 and a relatively broad support area 79. Section 75 has an internal helical wall 81 which extends upwardly from the inlet chamber 76 side of the section 75 to near the area 79 on the right side, referenced to FIGS. 1 and 4 of the drawings. The wall 81 is forged in the section 75 and is hidden in the sectional views shown. The upper end 82 of the partition 6 defines a seat 83 for a valve assembly 61. Valve assembly 61, for the purpose of this specification, includes a flexible diaphragm 11, a pilot valve member 32, a spring 38, a valve pin 44, a spring 41 and a solenoid actuator 19.

The upper portion 3 is attached to the lower portion 2 of the valve casing 100 along the flange 9 by any convenient means. Conventional threaded fasteners 10 work well, for example. Prior to the attachment of the upper and lower portions 2 and 3, the valve assembly 61 is positioned in the opening 8 so that the outer edge of the diaphragm 11 rests along the support area 79. Interconnection of the parts 2 and 3 secures the diaphragm 11 in the valve 1. An O-ring 12 is used to provide fluid seal along the flange 9, between the upper portion 3 and the lower portion 2 of the casing 100.

The upper portion 3 of the valve 1 includes a relatively flat base area 13 and a centrally located hub portion 14 extending upwardly from the base 13. It is conventional to use the base 13 for inserting the fasteners 10 in the interconnection of the portions 2 and 3. A solenoid 15 is mounted to the valve casing 1 along the hub portion in any convenient manner. For example, it is common to provide a lip 29 along a tube 18 which abuts a seat 28 defined by a wall 27 of the portion 3. Wall 27 delimits the interior contour of the upper portion 3. That contour may include a number of variations within the contour design for accommodating various structural devices and facilitating operation of the valve 1. A seal 30 is provided between the lip 29 and the upper portion 3. Thereafter, attachment of a biasing means 62 clamps the solenoid 15 against the hub portion 14 and simultaneously holds the lip 29 of the tube 18 against the seat 28. Other interconnection techniques are acceptable. For example, the lip 29 of the tube 18 may be staked within the hub portion 14 so that it becomes a part of the upper portion 3. With this construction, the biasing means 62 does not function to hold the tube against the seat 28. Other construction methods are compatible with the broader aspects of this invention.

Solenoid 15 is conventional and commonly includes electrical energizing means 16 connected to a source of electrical power, not shown, through a transformer 17. The tube 18, mounted centrally of the electrically energizable means 16, houses the solenoid actuator 19. The upper portion of the tube 18 contains a plug 20 which limits actuator 19 movement in response to solenoid 15 actuation. The construction of the solenoid 15 and tube 18, being conventional, is not described in detail.

Actuator 19 is a cylindrical body having a first end 21 and a second end 22. End 21 has an open mouth channel 23 formed in it, extending longitudinally of the actuator 19. A reduced diameter opening 24 forms a continuation of the channel 23 and extends from the bottom of the channel 23 to the end 22 of the actuator 19. The second end of the actuator 19 has a receptacle 25 formed in it which is sized to receive a valve member 26. Valve member 26 preferably is constructed from a resilient material. For example, neoprene works well. Other materials are suitable provided they are noncorrosive in the application environment. The valve member 26 has an opening in it which forms a continuation of the opening 24. The reference numeral 24 is intended to denominate both the opening in the actuator 19 described above and the opening in the valve member 26.

The valve member 26 may assume a variety of shapes. Attachment of the member 26 and actuator 19 is facilitated by forming a complementary tongue and groove 63 in the combination.

The wall 27 of the upper portion 3 also defines a chamber 31. When the diaphragm 11 is positioned as shown in FIG. 1, the inlet chamber 76 and the outlet chamber 77 are separated from one another and the chamber 31 by the diaphragm 11 and the partition 6. As indicated above, the diaphragm 11 is constructed from any suitable flexible material. The diaphragm 11 has an opening through it, not shown, which interconnects the inlet chamber 76 with the chamber 31. The pilot valve member 32 is attached to the diaphragm 11 along a central opening in the diaphragm. The valve member 32 is a one piece unit having an upper part 33 positioned on the chamber 31 side of the diaphragm 11, and a lower part 34 positioned on the outlet chamber side 77 of the diaphragm 11. Preferably, a groove 72 receives the diaphragm 11 in a tight fit and permits attachment of the diaphragm 11 to the pilot valve member 32.

The part 33 includes a central hub 35 which surrounds and delimits an opening 36. The opening 36 extends through the pilot valve member 32. The opening 36 is aligned axially with the opening 24 in the actuator 19 and defines a pilot valve opening in the valve 1 which extends between the chamber 31 and the outlet chamber 77. The hub 35 forms a seat for the valve member 26 which is intended to close the opening 36 in at least one position of the actuator 19. The part 33 also defines a seat 37 for the spring 38. The spring 38 is biased between the lip 29, seat 28 abutment and the seat 37 so as to exert a downward force on the pilot valve member 32 which is transmitted by the member 32 to the diaphragm 11. A broad annular area 64 extends outwardly from the hub 35. The area 64 is sized so as to overlap the seat 83 defined by the upper end 82 of the partition 6 and permits the spring 38 to force the diaphragm positively against the seat 83.

Part 34 is sized so as to pass through the opening 90 in the partition 6 and includes a central hub 39 having a receptacle 66 formed in it. The opening 36 communicates with the receptacle 66. Receptacle 66 is designed to receive one end of a spring 41. The second end of spring 41 seats against a retainer 42 mounted to an end 43 of the valve pin 44.

Figure 2:
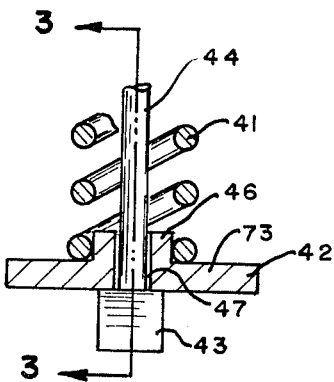
FIG. 2 is an enlarged sectional view taken about the area 2—2 of FIG. 1.
Figure 3:
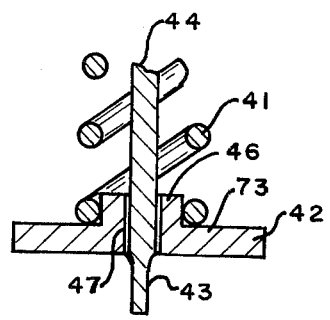
FIG. 3 is an enlarged sectional view taken along the line 3—3 of FIG. 2.

The valve pin 44 is a cylindrical body terminating in the end 43 and an end 45. The pin 44 is inserted through the channel 23 in the actuator 19 and is carried in the opening 24 and the opening 36 of the actuator 19 and pilot valve member 32, respectively. Both of the ends 43 and 45 are enlarged to aid in maintaining the correct position of the valve pin 44. As illustrated in FIGS. 2 and 3, the ends 43 and 45 may be enlarged by a simple press operation which deforms the respective ends of the pin 44. The retainer 42, best shown in FIGS. 2 and 3, includes an annular member 73 having a central hub 46 extending upwardly from it. The hub 46 has an opening 47 in it which receives the pin 44 in a slip fit. The end 43 of the pin 44 is sized so that it abuts the retainer 42 and prevents upward movement of the pin 44, referenced to the drawings. As indicated, spring 41 is biased between the retainer 42 and the hub 39 of the pilot valve member 32.

Operation of the device of FIG. 1 is relatively simple, as compared to other prior art devices. A source of inlet fluid is attached to the inlet 4. The fluid in the inlet chamber 4 passes through the opening in the diaphragm 11, 99, and fills the cavity 31, where it aids in maintaining the diaphragm in the closed position of the valve 1, which position is illustrated in FIG. 1. The spring 38 acts through the pilot valve member 32 to seat the diaphragm 11 against the seat 83.

The solenoid actuator 19, also shown in a position blocking the opening 36, is positively held against the hub 35 of the pilot valve member 32 by the bias of spring 41. When the solenoid 15 is energized, the actuator 19 moves upwardly, drawing the valve pin 44 with it. As pin 44 starts to raise, the spring 41 is compressed between the retainer 42 and hub 39. Movement of the actuator 19 lifts the valve member 26 from the hub 35, permitting the relatively high pressure fluid in the chamber 31 to flow through the pilot valve opening 36 to the outlet chamber 77. The loss of fluid pressure on the chamber 31 side of the diaphragm 11 permits the relatively high pressure in the inlet chamber 76 to overcome the bias force of the spring 38. Movement of the diaphragm 11 from the seat 83 opens the main flow passage of the valve 1 and fluid is permitted to pass from the inlet chamber 76, over the partition 6, to the outlet chamber 77.

The compression of the spring 41, which occurs as the solenoid actuator 19 moves upwardly, also creates a force on the diaphragm 11 acting to raise the diaphragm 11. This force is important where relatively low inlet 4 pressure is available. The bias force provided by the spring 41 insures that the diaphragm 11 opens each time the solenoid 15 is actuated. Spring 41 is chosen, however, so that the actuator 19 travels a full stroke each time the solenoid 15 is energized. Consequently, the solenoid 15 is less subject to overload conditions which may result where the actuator 19 does not complete a full stroke upon actuation of the solenoid.

Upon deactivation of the solenoid 15, the force on the diaphragm 11 provided by spring 41 is lessened. The spring 41 now acts to close the valve member 26 against the hub 35, restricting any flow through the opening 36. Fluid pressure in the chamber 31 quickly builds up and this force, together with the bias provided by the spring 38, positively closes the diaphragm 11 against the seat 83, thereby preventing fluid flow from the valve 1.

Figure 4:
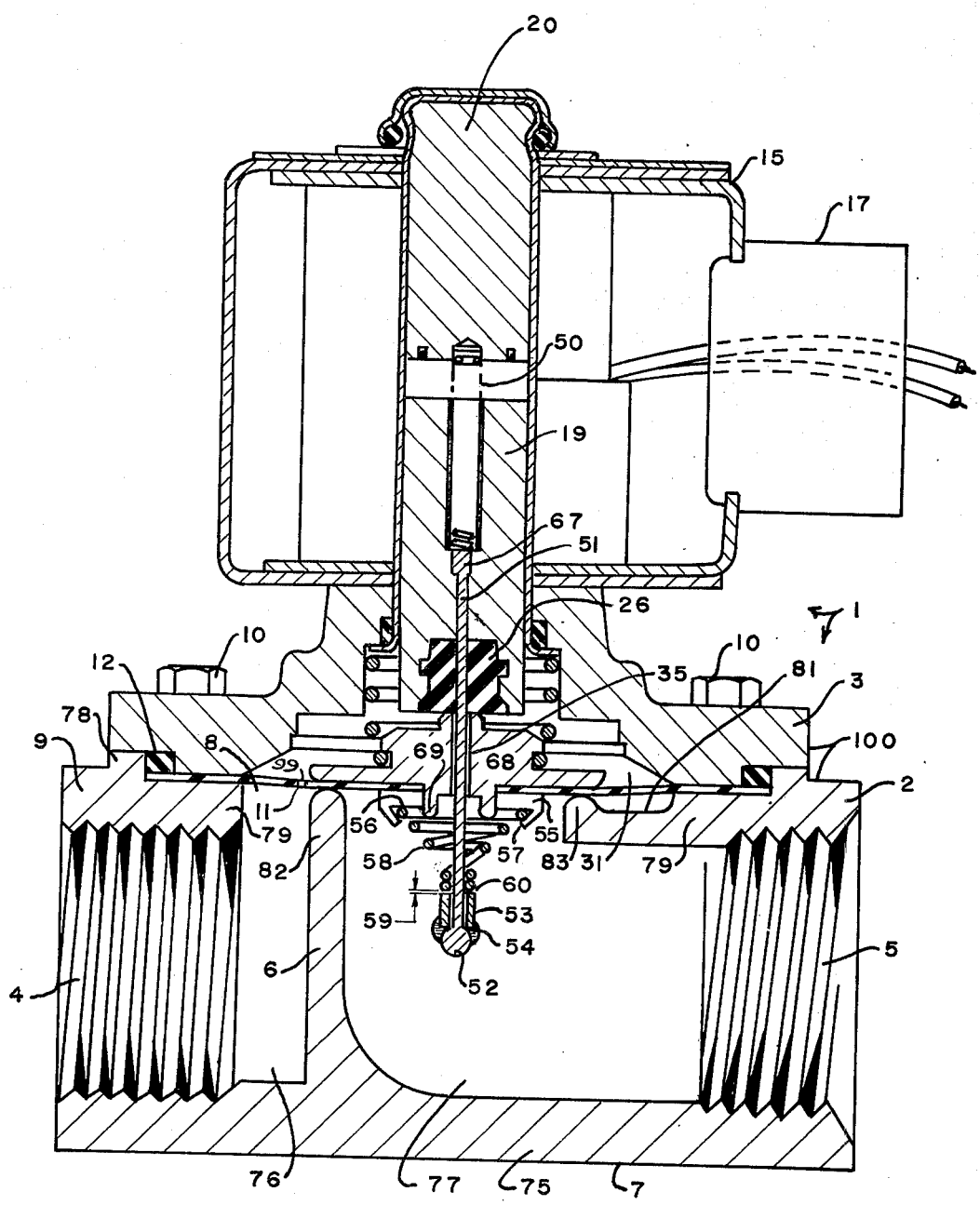
FIG. 4 is a cross-sectional view of a second illustrative embodiment of solenoid operated diaphragm valve of this invention, the valve being shown in its closed position.

In some applications, the biasing force provided by the spring 41 which, as indicated, tends to hold the valve member 26 seated against the hub 35, sometimes has proved wanting in that leakage through the pilot valve opening 36 may result. To protect against this leakage, a modification to the valve shown in FIG. 1 may be made. Referring now to FIG. 4, where like reference numerals are utilized to indicate like parts, reference numeral 50 indicates a spring biased between the plug 20 and an end 67 of a valve pin 51. The valve pin 51 has a second end 52. End 52 has a cylindrical, spring retainer 53 attached to it. Retainer 53 preferably is a cylindrical section which is brazed or dip soldered to the end 52 at 54. A pilot valve member 68 is similar to pilot valve member 32 except that the valve member 68 has a spring clasp 55 integrally formed in it outboard of a central hub area 69. Clasp 55 has a greater diameter at its bottom wall 56 than at its open mouth 57. A spring 58 is inserted in the clasp 55 and is frictionally engaged thereby. The axial relationship of spring 50, valve pin 51, valve member 26 and pilot valve member 68 is such that the predetermined spacing 59 exists between an end 60 of the spring 58 and the spring retainer 53 in the closed position of the valve, illustrated in FIG. 4. Preferably, the spacing 59 is in the order of twenty thousandths of an inch although other spacings are compatible with the broader aspects of this invention. Other structural components of the valve shown in FIG. 4 are similar to those shown and described in conjunction with the embodiment of FIG. 1, and are not described in detail.

Operation of the valve illustrated in FIG. 4 is substantially similar to that previously described in that the valve 26 is secured against the hub 35 of the pilot valve member 68. However, the spring 50 may exert a somewhat stronger force in the embodiment of FIG. 4, to prevent any leakage through the pilot valve. When the solenoid 15 is actuated, the spacing 59 enables the actuator 19 initially to work against relatively little load. As the actuator 19 moves and gains momentum in its upward stroke towards the plug 20, it picks up the spring 58. As the spring 58 is picked up, it tends to compress between the retainer 53 and the clasp 55 which compression exerts an upward force on the diaphragm 11. Pilot valve operation thereafter is the same as described above.

Deactivation of the solenoid 15 again permits the valve to close. Spring 50 positively seats the valve member 26 against the hub 35, after which the valve is ready for the succeeding cycle. While either of the embodiments of FIGS. 1 and 4 will function for the purposes intended, the spring 50 permits the inclusion of a safety margin in valve design that insures the prevention of leakage through the opening 36.

Numerous variations, within the scope of the appended claims will be apparent to those skilled in the art in light of the foregoing description and accompanying drawings. For example, the design of the pilot valve member 32 may be varied in other embodiments of this invention. Likewise, the silhouette of the upper and lower portions 2 and 3 may vary, as may solenoid 15 design. Various materials may be substituted for those described or preferred. Other means for attaching the spring 58 or the spring 41 to the respective valve members may be used. Other termination designs of the respective valve pins 41 and 51 will occur to those skilled in the art. These variations are merely illustrative.

Having thus described the invention, what is claimed and desired to be secured by Letters Patent is:

1. A valve comprising:
    a valve body having an inlet, an outlet, a main flow port between said inlet and said outlet, and a chamber about said main flow port on the inlet side of said main flow port;
    a flexible diaphragm mounted for movement in said chamber between a first position closing said main flow port and a second position opening said main flow port, said diaphragm having an opening in it to permit fluid flow between said inlet and said chamber;
    a pilot valve member mounted to said diaphragm and movable therewith, said pilot valve member having a pilot opening through it, said pilot opening communicating with said chamber and said outlet;
    a valve pin mounted in said pilot opening, said valve pin having a first end and a second end;
    a solenoid mounted to said valve body, said solenoid including an actuator mounted for movement between a first position closing said pilot passage, and a second position opening said pilot passage, the second end of said pilot valve pin being attached to said actuator so that said pin is movable with said actuator;

a first spring means mounted in said chamber and adapted to insert a force on said diaphragm so as to urge said diaphragm towards its closed position;

second spring means mounted on the outlet side of said diaphragm and adapted to bias said diaphragm toward its open position in at least one position of said diaphragm, said second spring means being attached to said pilot valve member on a first end of said second spring means, a second end of said second spring means being adapted to engage the first end of said valve pin in at least a first position of said diaphragm, said second end of said second spring being spaced and free from the first end of said valve pin in at least another position of said diaphragm, the distance between said second spring means end and said valve pin being approximately twenty thousandths of an inch (0.0020); and third spring means biased between said solenoid and said actuator so as to urge said actuator towards its closed position.

2. The valve of claim 1 wherein said first end of said valve pin has a spring retainer attached to it, said spring retainer engaging the free end of said second spring means as said actuator moves in response to energization of said solenoid.

3. The valve of claim 2 wherein said pilot valve member includes a central hub structure formed on the outlet port side of said diaphragm, said valve member having a clasp means formed in it outboard of said hub structure, said clasp means including an open mouth chamber having at least a first diameter at said open mouth, and a second diameter, said first diameter being smaller than said second diameter.

4. The valve of claim 3 wherein said actuator has a channel formed in it, and said solenoid includes a tubular structure for receiving said actuator and permitting movement thereof, said tubular structure having a plug positioned in one end thereof, said third spring means being carried in said channel and biased between said plug and said actuator so as to bias said actuator towards the closed position of said pilot passage.

5. A valve comprising:
a valve body having an inlet, an outlet, a main flow port between said inlet and said outlet, and a chamber about said main flow port on the inlet side of said main flow port;

a flexible diaphragm mounted for movement in said chamber between a first position closing said main flow port and a second position opening said main flow port, said diaphragm having an opening in it to permit fluid flow between said inlet and said chamber;

a pilot valve member mounted to said diaphragm and movable therewith, said valve member having a pilot opening through it, said pilot opening communicating with said chamber and said outlet;

a valve pin mounted in said pilot opening, said valve pin having first and second ends;

a solenoid mounted to said valve body, said solenoid including an actuator mounted for movement between a first position closing said pilot passage and a second position opening said pilot passage, the second end of said pilot valve pin being attached to said actuator so that said pin is movable with said actuator;

first spring means mounted in said chamber and adapted to exert a force on said diaphragm so as to urge said diaphragm towards its closed position; and second spring means mounted on the outlet side of said diaphragm, said second spring means having a first end and a second end, said first end being operatively connected to said flexible diaphragm, the second end of said spring being spaced from and free of the first end of said valve pin in at least one position of said diaphragm.

6. The valve of claim 5 further characterized by third spring means biased between said solenoid and said actuator so as to urge said actuator towards its closed position.

7. The valve of claim 6 wherein the distance between the free end of said second spring means and the first end of said valve pin is in the magnitude of twenty thousandths of an inch (0.0020).

8. The valve of claim 7 wherein said pilot valve member includes a central hub structure formed on the outlet side of said diaphragm, said valve member having clasp means formed in it outboard of said hub structure, said clasp means including an open mouth chamber part having at least a first diameter at said open mouth and a second diameter, said first diameter being smaller than said second diameter.

* * * * *